United States Patent
Matsushima et al.

(10) Patent No.: US 7,970,492 B2
(45) Date of Patent: Jun. 28, 2011

(54) MOBILE ROBOT CONTROL SYSTEM

(75) Inventors: Kuniaki Matsushima, Wako (JP);
Yuichiro Kawaguchi, Wako (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 583 days.

(21) Appl. No.: 11/988,994

(22) PCT Filed: Jul. 10, 2006

(86) PCT No.: PCT/JP2006/313660
§ 371 (c)(1),
(2), (4) Date: Jan. 18, 2008

(87) PCT Pub. No.: WO2007/010773
PCT Pub. Date: Jan. 25, 2007

(65) Prior Publication Data
US 2009/0254216 A1 Oct. 8, 2009

(30) Foreign Application Priority Data
Jul. 22, 2005 (JP) .................. 2005-213209

(51) Int. Cl.
*G05B 19/04* (2006.01)
(52) U.S. Cl. .......... 700/246; 700/56; 700/245; 700/254; 700/258; 701/213; 701/214
(58) Field of Classification Search .................. 700/245, 700/246
See application file for complete search history.

(56) References Cited

U.S. PATENT DOCUMENTS

| | | | | |
|---|---|---|---|---|
| 5,568,030 A | * | 10/1996 | Nishikawa et al. | 318/587 |
| 5,737,217 A | * | 4/1998 | Nishikawa et al. | 700/56 |
| 5,812,267 A | * | 9/1998 | Everett et al. | 356/614 |
| 5,937,143 A | | 8/1999 | Watanabe et al. | |
| 6,584,377 B2 | * | 6/2003 | Saijo et al. | 700/245 |
| 7,054,718 B2 | * | 5/2006 | Miyamoto et al. | 700/258 |

(Continued)

FOREIGN PATENT DOCUMENTS
JP 2-224994 9/1990
(Continued)

OTHER PUBLICATIONS

Official Communication issued in the corresponding International Application No. 06768022.3, mailed Dec. 7, 2010.

*Primary Examiner* — Khoi Tran
*Assistant Examiner* — Jonathan L. Sample
(74) *Attorney, Agent, or Firm* — Squire, Sanders & Dempsey (US) LLP (57) ABSTRACT

In a mobile robot control system, it is configured to input at least one of the desired position and orientation of the robot at a time when the robot reaches the desired position by manipulation of the operator, to control the motion of the robot based on the inputted desired position and orientation, and to display a first image indicative of the inputted desired position and orientation by numeric values or language including at least the numeric values and a second image indicative of the inputted desired position and orientation by graphics on a display. With this, the operator can check the desired position and orientation of the robot with both of the numeric values and graphics. As a result, it becomes possible to prevent the operator from manipulating erroneously and operate the robot to be moved or turned as desired by the operator.

12 Claims, 10 Drawing Sheets

U.S. PATENT DOCUMENTS

| | | | |
|---|---|---|---|
| 7,221,999 B2 * | 5/2007 | Sano | 700/254 |
| 7,298,385 B2 * | 11/2007 | Kazi et al. | 345/633 |
| 7,317,388 B2 * | 1/2008 | Kawabe et al. | 340/539.13 |
| 2001/0037163 A1 * | 11/2001 | Allard | 700/245 |
| 2002/0143461 A1 * | 10/2002 | Burns et al. | 701/117 |
| 2003/0023347 A1 | 1/2003 | Konno et al. | |
| 2003/0025472 A1 * | 2/2003 | Jones et al. | 318/568.12 |
| 2003/0120391 A1 * | 6/2003 | Saito | 700/264 |
| 2003/0216834 A1 * | 11/2003 | Allard | 700/245 |
| 2004/0172168 A1 * | 9/2004 | Watanabe et al. | 700/264 |
| 2004/0176875 A1 * | 9/2004 | Iribe et al. | 700/245 |
| 2005/0080515 A1 * | 4/2005 | Watanabe et al. | 700/264 |
| 2005/0256611 A1 * | 11/2005 | Pretlove et al. | 700/264 |
| 2006/0082642 A1 * | 4/2006 | Wang et al. | 348/14.05 |
| 2008/0221729 A1 * | 9/2008 | Lavarec | 700/245 |

FOREIGN PATENT DOCUMENTS

| | | |
|---|---|---|
| JP | 3-22106 | 1/1991 |
| JP | 5-169391 | 7/1993 |
| JP | 6-99376 | 4/1994 |
| JP | 7-32288 | 2/1995 |
| JP | 10-11122 | 1/1998 |
| JP | 10-315171 | 12/1998 |
| JP | 11-149315 | 6/1999 |
| JP | 2003-136455 | 5/2003 |
| JP | 2003-532218 | 10/2003 |
| JP | 2003-532218 A * | 10/2003 |

* cited by examiner

MOBILE ROBOT CONTROL SYSTEM

TECHNICAL FIELD

This invention relates to a mobile robot control system.

BACKGROUND ART

As a mobile robot control system, a technique taught by Patent Reference 1 can be given as an example. In the technique described in Patent Reference 1, a mobile robot (i.e., a self-propelled vacuum cleaner with a powered wheel) is equipped with image recognition means that acquires image information. When the mobile robot is stopped owing to interference by an obstacle, the image information is sent to an external terminal (e.g., a personal computer) having an image displaying function and a remote-control function, whereby the operator can remote-control the mobile robot while viewing the displayed image information.
Patent Reference 1: Japanese Laid-Open Patent Application No. 2003-256041 (paragraph 0026, etc.)

DISCLOSURE OF THE INVENTION

Problems to be Solved by the Invention

In the technique disclosed in Patent Reference 1 above, the operator can remote-control the mobile robot while viewing the displayed image information acquired by the mobile robot. However, if the operator manipulates (inputs) erroneously, it is impossible, naturally, to make the mobile robot act as desired, so it has been desired to prevent the operator from manipulating (inputting) erroneously.

Therefore, an object of this invention is to overcome the aforesaid drawback and provide a mobile robot control system that can prevent the operator from manipulating (inputting) erroneously and enables to operate the robot to be moved or turned as desired by the operator.

Means for Solving the Problems

In order to achieve the object, as recited in claim 1 mentioned below, this invention is configured to have a system for controlling motion of a mobile robot such that the robot moves to a desired position, characterized by: inputting means provided to be manipulated by an operator for inputting at least one of the desired position and orientation of the robot at a time when the robot reaches the desired position; displaying means for displaying an image indicative of the inputted desired position and orientation on a display; and control means for controlling the motion of the robot based on the inputted desired position and orientation; and the displaying means displays a first image indicative of the inputted desired position and orientation by numeric values or language including at least the numeric values and a second image indicative of the inputted desired position and orientation by graphics.

As recited in claim 2 mentioned below, this invention is configured such that the inputting means includes: numeric value inputting means provided to be manipulated by an operator for inputting at least one of the desired position and orientation by the numeric values; and the displaying means changes the graphics displayed on the second image based on the desired position and orientation inputted by the numeric values.

As recited in claim 3 mentioned below, this invention is configured such that the inputting means includes: graphic inputting means provided to be manipulated by an operator for inputting at least one of the desired position and orientation by the graphics; and the displaying means changes the numeric values displayed on the first image based on the desired position and orientation inputted by the graphics.

As recited in claim 4 mentioned below, this invention is configured such that the system further includes: surrounding information acquiring means for acquiring surrounding information of the robot; and movability determining means for determining whether the robot can move based on the inputted desired position and orientation and the acquired surrounding information; and the displaying means displays a third image indicative of a result of the movability determination on the display.

As recited in claim 5 mentioned below, this invention is configured such that the displaying means displays the robot with the graphics on the second image.

As recited in claim 6 mentioned below, this invention is configured such that the displaying means generates a motion image of the robot based on amount of motion of the robot, and displays the motion image with the graphics on the second image.

As recited in claim 7 mentioned below, this invention is configured such that the system further includes: upper limit setting means for setting an upper limit of a distance from the current position of the robot to the desired position; and desired position invalidating means for invalidating the inputted desired position when the distance exceeds the upper limit.

EFFECTS OF THE INVENTION

In the mobile robot control system according to claim 1, since it is configured to input at least one of the desired position and orientation of the robot at a time when the robot reaches the desired position by manipulation of the operator, to control the motion of the robot based on the inputted desired position and orientation, and to display a first image indicative of the inputted desired position and orientation by numeric values or language including at least the numeric values and a second image indicative of the inputted desired position and orientation by graphics, the operator can check the desired position and orientation of the robot with both of the numeric values (or language including at least the numeric values) and graphics. As a result, it becomes possible to prevent the operator from manipulating (inputting) erroneously and operate the robot to be moved or turned as desired by the operator.

In the mobile robot control system according to claim 2, since it is configured to input at least one of the desired position and orientation by the numeric values by manipulation of the operator, and to change the graphics displayed on the second image based on the desired position and orientation inputted by the numeric values, the operator can also check the desired position and orientation inputted by the numeric values by the displayed graphics. As a result, it becomes possible to efficiently prevent the operator from manipulating (inputting) erroneously and operate the robot to be moved or turned as desired by the operator.

In the mobile robot control system according to claim 3, since it is configured to input at least one of the desired position and orientation by the graphics by manipulation of the operator and to change the numeric values displayed on the first image based on the desired position and orientation inputted by the graphics, the operator can also check the desired position and orientation inputted by the graphics by the numeric values. As a result, it becomes possible to efficiently prevent the operator from manipulating (inputting) erroneously and operate the robot to be moved or turned as desired by the operator.

In the mobile robot control system according to claim 4, since it is configured to acquire surrounding information of the robot, to determine whether the robot can move based on the inputted desired position and orientation and the acquired surrounding information, and to display a third image indicative of a result of the movability determination on the display, in addition to the effects mentioned above, even when the operator cannot visually check the robot or the surrounding of a destination of the robot, it becomes possible to operate the robot to be moved or turned as desired by the operator.

In the mobile robot control system according to claim 5, since it is configured to display the robot with the graphics on the second image, in addition to the effects mentioned above, the operator can recognize the desired position and orientation more easily, thereby further efficiently preventing the operator from manipulating erroneously.

In the mobile robot control system according to claim 6, since it is configured to generate a motion image of the robot based on amount of motion of the robot, and to display the motion image with the graphics on the second image, the operator can recognize the desired position and orientation more easily, thereby further efficiently preventing the operator from manipulating erroneously.

In the mobile robot control system according to claim 6 since it is configured to set an upper limit of a distance from the current position of the robot to the desired position, and to invalidate the inputted desired position when the distance exceeds the upper limit, by appropriately set the upper limit depending on the degree of operator's proficiency, it becomes possible to prevent the operator's intention from deviating from the actual motion of the robot. As a result, it becomes possible to operate the robot to be moved or turned as desired by the operator.

BEST MODES OF CARRYING OUT THE INVENTION

Preferred embodiments for carrying out a mobile robot control system according to the present invention will now be explained with reference to the attached drawings.

First Embodiment

Figure 1:
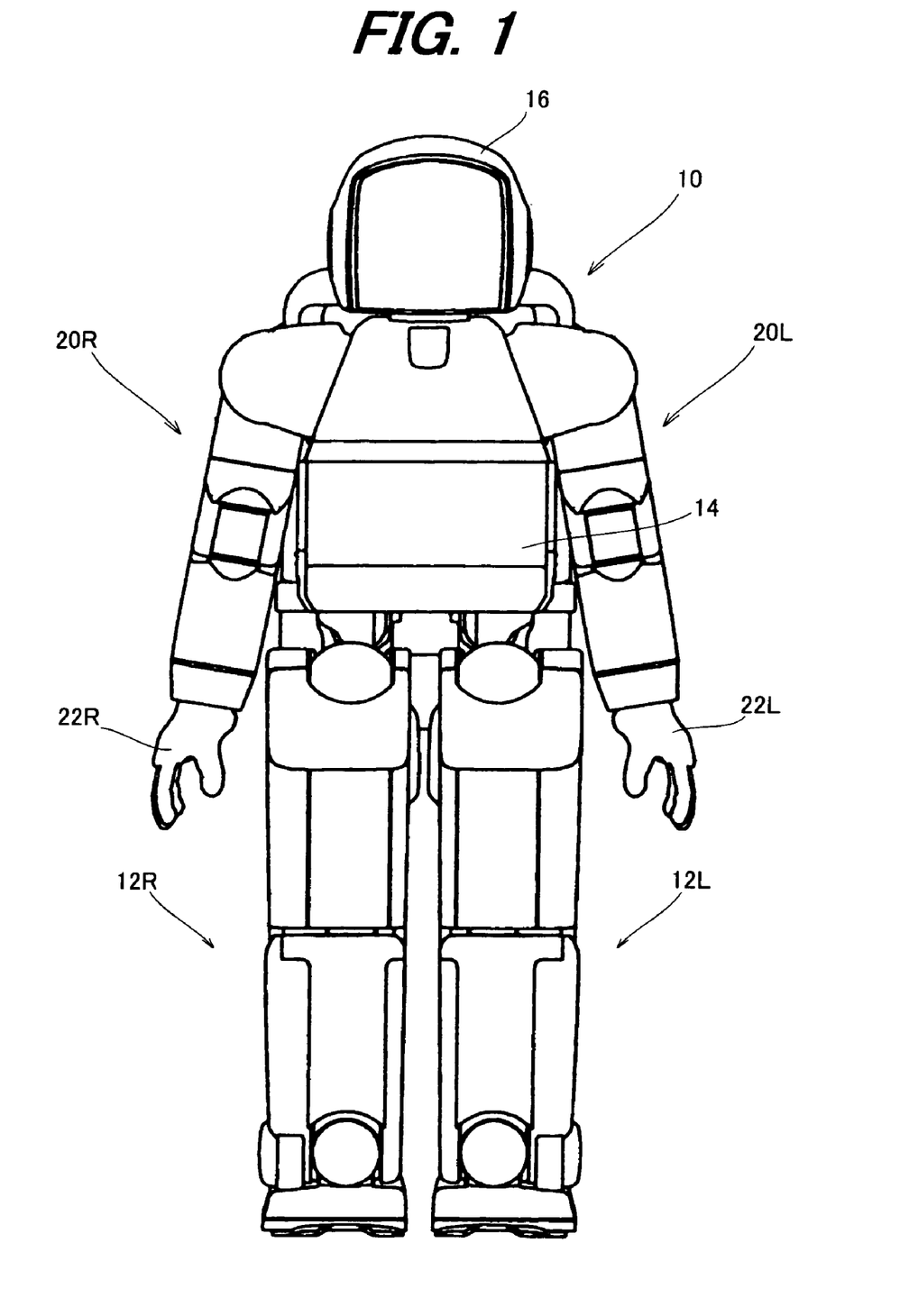
FIG. 1 is a front view of a robot to which a mobile robot control system according to a first embodiment of the invention is applied.
Figure 2:
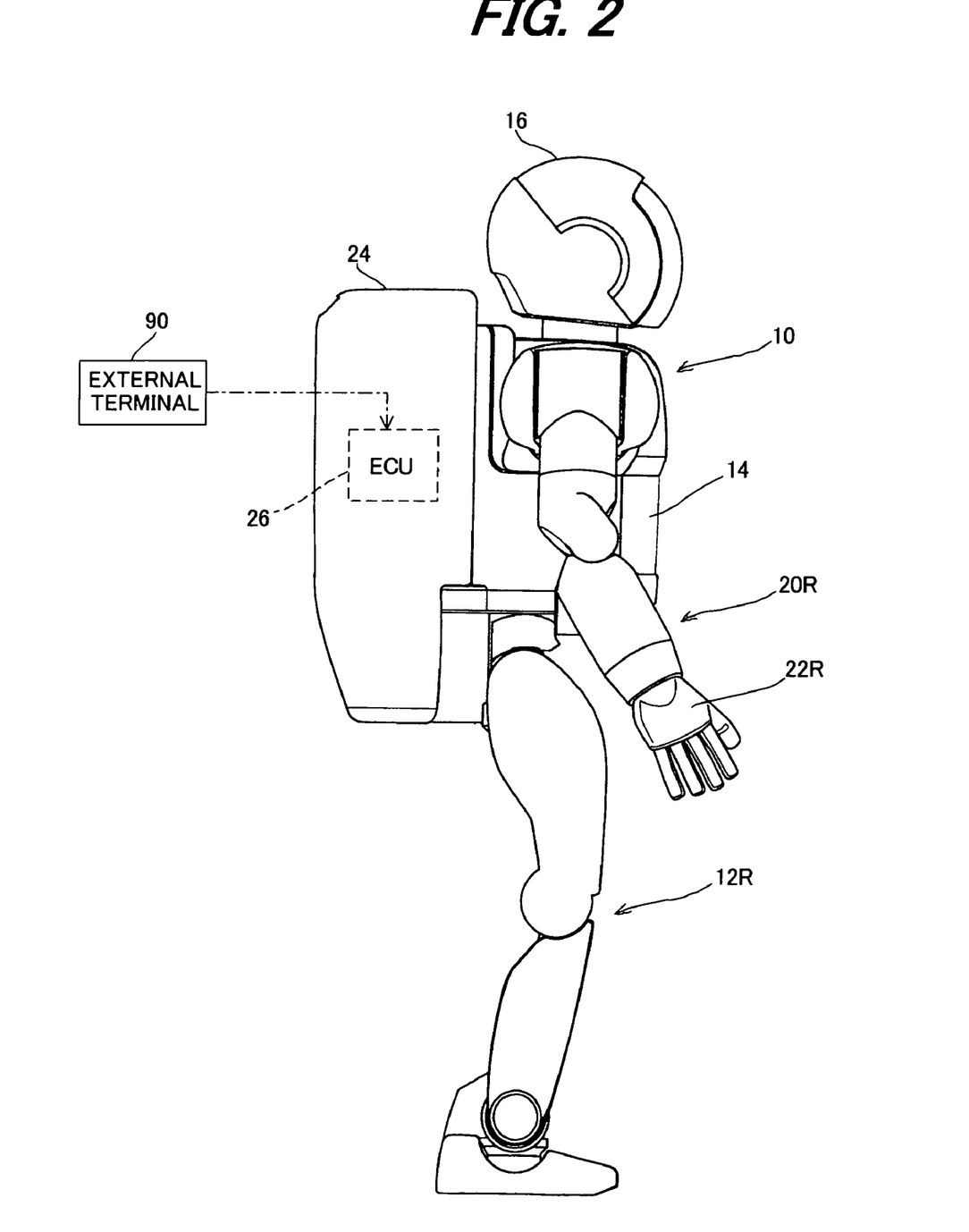
FIG. 2 is a side view of the robot shown in FIG. 1.

FIG. 1 is a front view of a mobile robot to which a mobile robot control system according to a first embodiment of the invention is applied and FIG. 2 is a side view of the robot shown in FIG. 1. It should be noted that, in the embodiments a humanoid legged mobile robot provided with two legs and two arms is taken as an example of the mobile robot.

As shown in FIG. 1, the mobile robot (hereinafter referred to as "robot") 10 is equipped with right and left legs 12R, 12L (R and L indicating the right and left sides; hereinafter the same). The legs 12R, 12L are connected to the lower end of a body 14. A head 16 is connected to the upper end of the body 14 and right and left arms 20R, 20L are connected to opposite sides of the body 14. Hands 22R, 22L are attached to the distal ends of the right and left arms 20R, 20L.

As shown in FIG. 2, a housing unit 24 is mounted on the back of the body 14 for accommodating an electronic control unit (hereinafter referred to as "ECU") 26, a battery (not shown) and the like.

Figure 3:
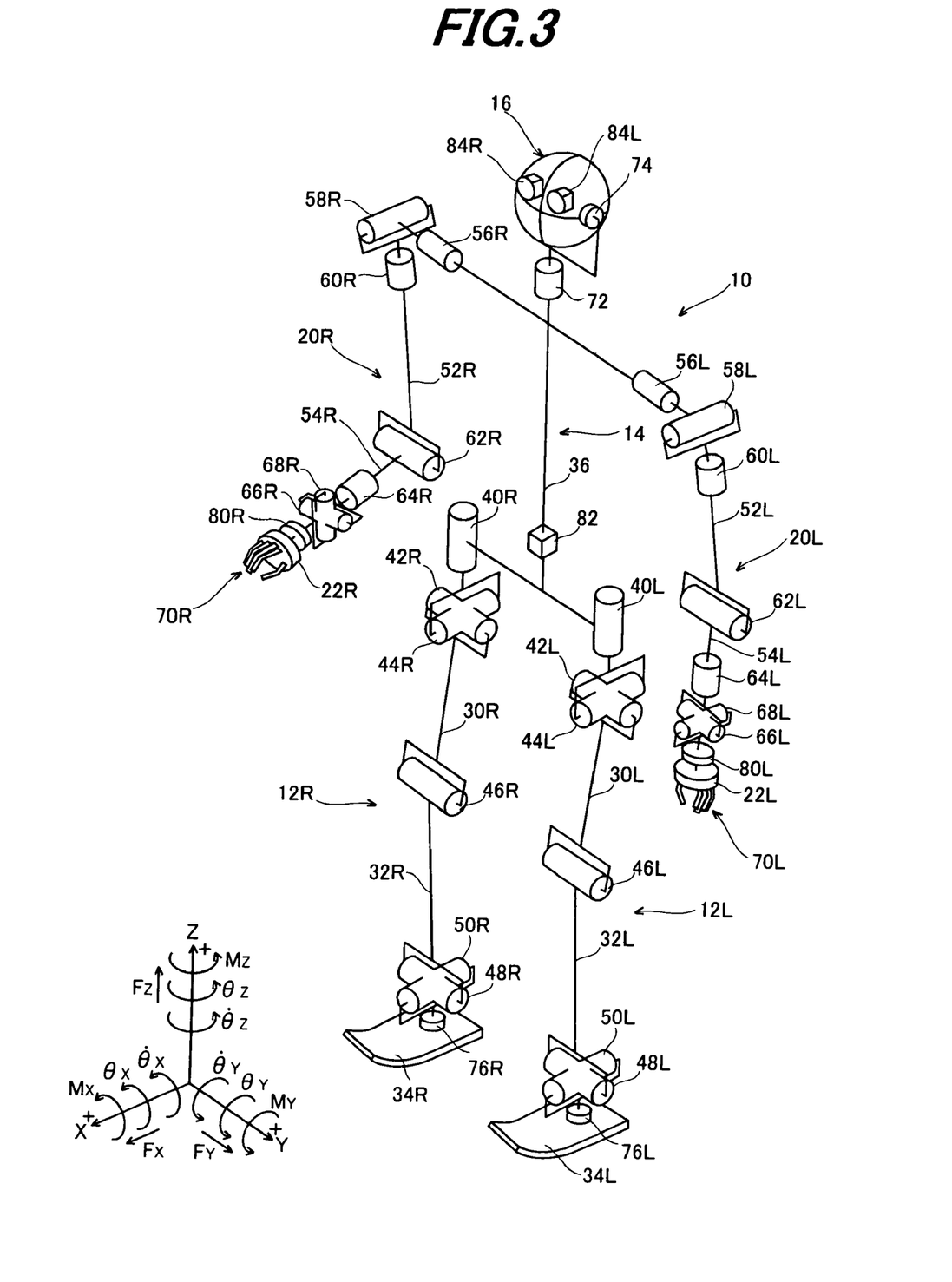
FIG. 3 is an explanatory view showing a skeletonized view of the robot shown in FIG. 1.

FIG. 3 is an explanatory view showing a skeletonized view of the robot 10 shown in FIG. 1. The internal structures of the robot 10 will be explained with reference to FIG. 3, with primary focus on the joints.

The right and left legs 12R, 12L are equipped with thigh links 30R, 30L, shank links 32R, 32L and feet 34R, 34L. The thigh links 30R, 30L are connected to the body 14 through hip (crotch) joints. The body 14 is represented in FIG. 3 simply by a body link 36. The thigh links 30R, 30L and shank links 32R, 32L are interconnected by knee joints, and the shank links 32R, 32L and feet 34R, 34L are interconnected by ankle joints.

The hip joints are constituted of rotary shafts 40R, 40L rotating about the Z axis (yaw axis; specifically in the height direction of the robot 10), rotary shafts 42R, 42L rotating about the Y axis (pitch axis; specifically in the lateral direction of the robot 10), and rotary shafts 44R, 44L rotating about the X axis (roll axis; specifically in the back-and-forth direction of the robot 10). The hip joints are each provided with 3 degrees of freedom.

It should be noted that in the embodiments the upside of the vertical axis is a plus direction of the Z axis and the downside thereof is a minus direction. Similarly, the fore of the robot 10 is a plus direction of the X axis and the rear thereof is a minus direction, and the left side (in the advancing direction) of the robot 10 is a plus direction of the Y axis and the right side thereof is a minus direction.

The knee joints are constituted of rotary shafts 46R, 46L rotating about the Y axis and each provided with 1 degree of freedom. The ankle joints are constituted of rotary shafts 48R, 48L rotating about the Y axis and rotary shafts 50R, 50L rotating about the X axis and each provided with 2 degrees of freedom. Thus the right and left legs 12R, 12L are each provided with 6 rotary shafts (6 degrees of freedom) constituting the three joints, i.e., the whole legs are provided with a total of 12 rotary shafts.

The legs 12R, 12L are driven by actuators (not shown). Specifically, the actuators driving the legs 12R, 12L comprise 12 electric motors disposed at appropriate positions in the body 14 and legs 12R, 12L and drive the 12 rotary shafts individually or separately. Owing to the foregoing configuration, the legs 12R, 12L can be imparted with desired movements by controlling the operation of the motors to drive the rotary shafts to appropriate angles.

The right and left arms 20R, 20L are equipped with upper arm links 52R, 52L, forearm links 54R, 54L and the hands 22R, 22L. The upper arm links 52R, 52L are connected through shoulder joints to the body 14. The upper arm links 52R, 52L and forearm links 54R, 54L are interconnected by elbow joints and the forearm links 54R, 54L and hands 22R, 22L are interconnected by wrist joints.

The shoulder joints are constituted of rotary shafts 56R, 56L rotating about the Y axis, rotary shafts 58R, 58L rotating about the X axis and rotary shafts 60R, 60L rotating about the Z axis and each provided with 3 degrees of freedom. The elbow joints are constituted of rotary shafts 62R, 62L rotating about the Y axis and each provided with 1 degree of freedom. The wrist joints are constituted of rotary shafts 64R, 64L rotating about the Z axis, rotary shafts 66R, 66L rotating about the Y axis and rotary shafts 68R, 68L rotating about the X axis and each provided with 3 degrees of freedom. Thus the right and left arms 20R, 20L are each provided with 7 rotary shafts (7 degrees of freedom) constituting the three joints, i.e., the whole arms are provided with a total of 14 rotary shafts.

Similar to the legs 12R, 12L, the arms 20R, 20L are also driven by actuators (not shown). Specifically, the actuators driving the arms 20R, 20L comprise 14 electric motors disposed at appropriate positions in the body 14 and arms 20R, 20L and drive the 14 rotary shafts individually or separately. Owing to the foregoing configuration, the arms 20R, 20L can be imparted with desired movements by controlling the operation of the motors to drive the rotary shafts to appropriate angles.

The each hand 22R(22L) is equipped with five fingers 70R(70L). Each of the fingers 70R, 70L is freely driven by a drive mechanism (having actuators; not shown) and can be operated to grasp an object, for instance, in cooperation with the movement of arms 20R, 20L.

The head 16 is connected to the body 14 through a neck joint. The neck joint is constituted of a rotary shaft 72 rotating about the Z axis and a rotary shaft 74 rotating about the Y axis and is provided with 2 degrees of freedom. The rotary shafts 72 and 74 are also driven by actuators (electric motors; not shown) individually or separately.

Six-axis force sensors 76R, 76L are attached to the right and left legs 12R, 12L (specifically, between the feet 34R, 34L and ankle joints), respectively. The six-axis force sensors 76R, 76L produce outputs or signals indicative of the floor reaction force components Fx, Fy and Fz of three directions and the moment components Mx, My and Mz of three directions acting on the legs 12R, 12L (specifically, acting on the robot 10 through the legs 12R, 12L) from the surface of contact.

Similar six-axis force sensors 80R, 80L are attached to the right and left arms 20R, 20L (specifically, between the hands 22R, 22L and wrist joints), respectively. The six-axis force sensors 80R, 80L produce outputs or signals indicative of the external force components Fx, Fy and Fz of three directions and the moment components Mx, My and Mz of three directions acting on the arms 20R, 20L (specifically, acting on the robot 10 through the arms 20R, 20L).

An inclination sensor 82 is installed on the body 14 and produces an output or signal representing at least one of the inclination (tilt angle) of the body 14 relative to the vertical axis and the angular velocity thereof, i.e., representing at least one quantity of state such as the inclination (posture) of the body 14. The interior of the head 16 is mounted therein with right and left CCD cameras 84R, 84L respective of which takes an image of the surrounding of the robot 10 and simultaneously outputs the taken image.

The outputs from the sensors and the cameras are sent to the ECU 26 shown in FIG. 2. The ECU 26 comprises a microcomputer having a CPU, an input/output circuit, a ROM, a RAM and the like (none of which are shown), and is freely communicated with an external terminal 90.

Figure 4:
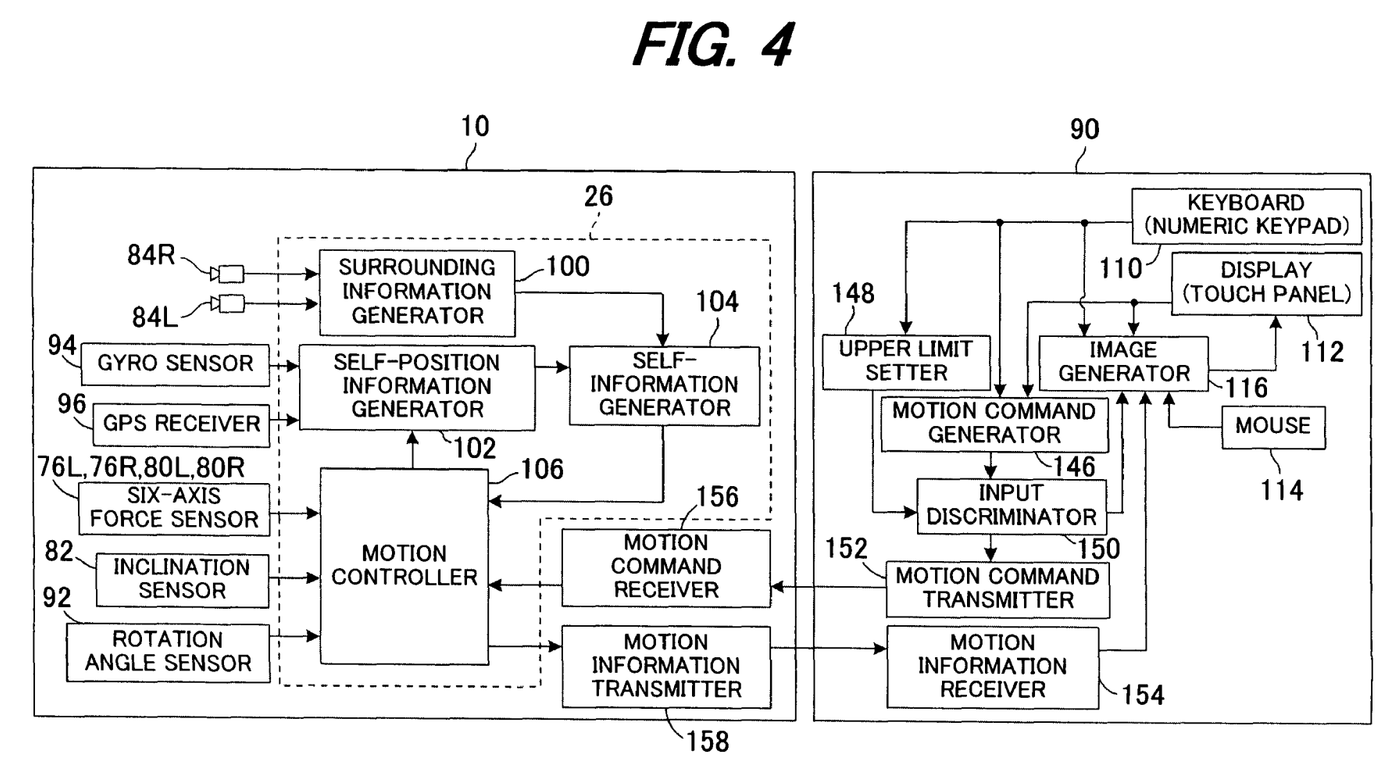
FIG. 4 is a block diagram functionally showing the structures of the robot shown in FIG. 2 and an external terminal, and the operation thereof.

FIG. 4 is a block diagram functionally showing the structure of the robot 10 and external terminal 90, and the operation thereof.

As shown in FIG. 4, the robot 10 having the sensors and cameras mentioned in the foregoing is further equipped with rotation angle sensors 92, a gyro sensor 94 and a GPS receiver 96. The rotation angle sensors 92 are constituted of a number of rotary encoders that produce outputs or signals indicative of the rotation angles of the aforesaid rotary shafts (i.e., operation amounts of the motors). The gyro sensor 94 produces an output or signal indicative of the moving distance and direction of the robot 10. The GPS receiver 96 receives radio wave transmitted from satellites to acquire information about the position (latitude and longitude) of the robot 10.

The ECU 26 is equipped with a surrounding information generator 100, self-position information generator 102, self-information generator 104 and motion controller 106. The surrounding information generator 100 is inputted with the image acquired by the CCD cameras 84R, 84L to produce information about the surroundings of the robot 10. Specifically, it produces three-dimensional distance data based on the brightness of the acquired image taken by the CCD cameras 84R, 84L, extracts clusters representing an obstacle(s) from the distance data by using, for instance, the histogram processing, and extracts an amount of characteristics such as an average position, size and the like of the obstacles in the real space from the extracted clusters to generate an obstacle map of the surroundings of the robot 10. Since the technique related to the obstacle detection is described in detail in Japanese Laid-Open Patent Application Nos. 2001-242934 and 2002-286416 proposed earlier by the applicant, the further explanation is omitted.

The self-position information generator 102 produces current position information of the robot 10 based on position information inputted from the GPS receiver 96. When the GPS receiver 96 is not able to receive radio wave transmitted from satellites, it produces the current position information based on the moving direction and distance of the robot 10 detected by the gyro sensor 94. The current position information may be produced based on the amount of motion of the robot 10 detected by the rotation angle sensors 92 or control values (explained later) of the motors sent from the motion controller 106.

The self-information generator 104 produces self-information such as a self-position with respect to an obstacle based on the surrounding information (obstacle map) of the robot 10 produced by the surrounding information generator 100 and the current position information of the robot 10 produced by the self-position information generator 102. The self-information produced by the self-information generator 104 is forwarded to the motion controller 106.

The external terminal 90 comprises a personal computer equipped with a keyboard (numeric keypad) 110 provided to be freely operable by the operator, a display 112 of a touch panel type and a mouse 114. A desired position of the robot 10 and an orientation thereof at the time when the robot 10 reaches the desired position (moving direction; hereinafter simply called the "orientation") can be freely inputted by operating the keyboard 110 to input numeric values, touching the display (touch panel) 112 or manipulating the mouse 114 to use a graphic. It should be noted that in this description, a term "graphic" means a figure constituted of points, lines, plane etc. and, in the narrow sense, means a symbol having a function to represent a certain content.

The external terminal 90 is equipped with an image generator 116. The image generator 116 produces an image based on the desired position and orientation inputted through the keyboard 110, display 112 and mouse 114, and displays (outputs) the image on the display 112.

Figure 5:
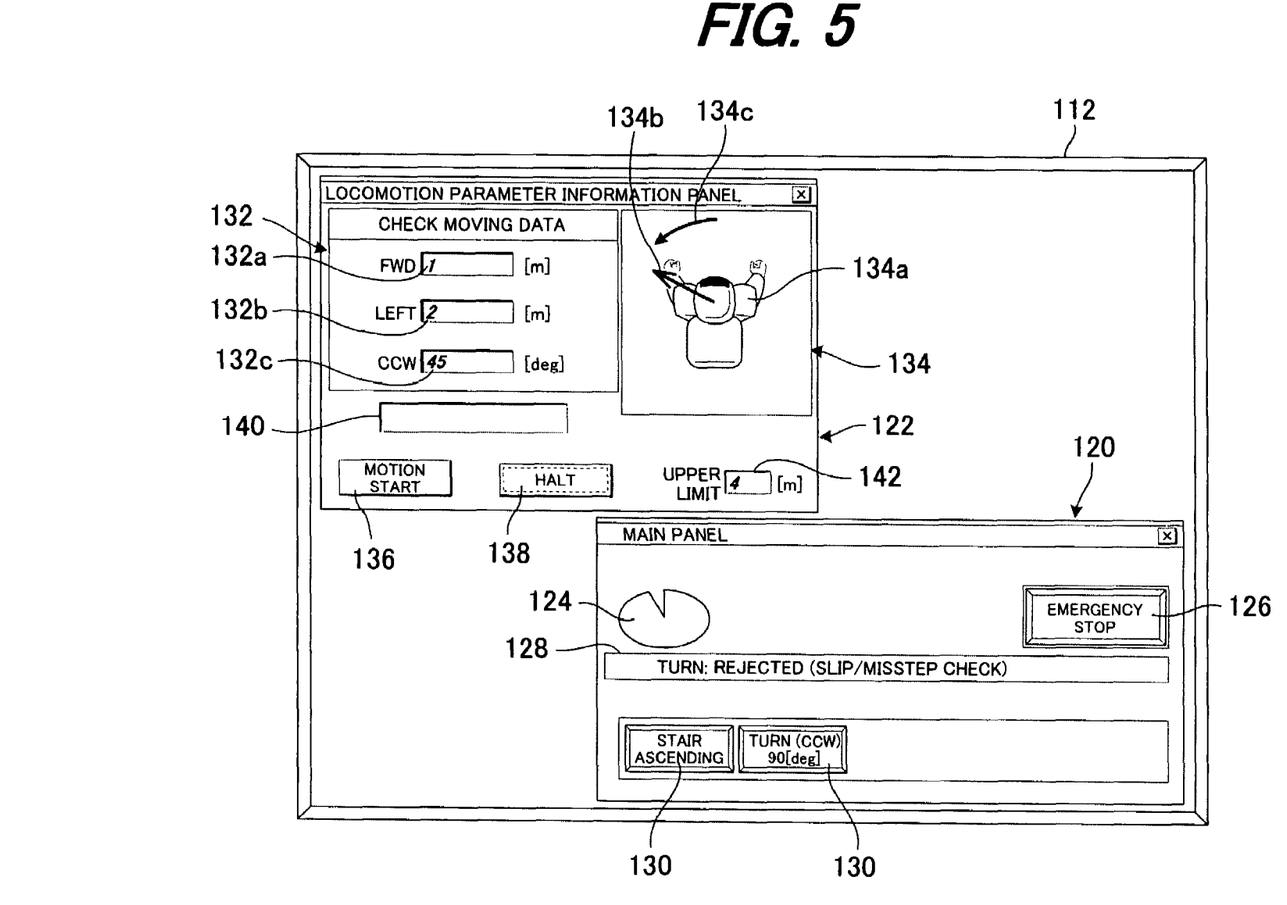
FIG. 5 is a plan view showing a display shown in FIG. 4 and displayed images thereon.

FIG. 5 is a plan view showing the display 112 and the displayed images thereon.

As shown in FIG. 5, a main panel 120 and locomotion parameter information panel 122 are displayed on the display 112. In the main panel 120, a communication state indication image 124, emergency stop button 126, motion information indication box 128 (third image) and a plurality of specific motion buttons 130 are indicated. The motion information indication box 128 corresponds to a "third image" recited in claims.

In the locomotion parameter information panel 122, an image 132 that indicates by numeric values the desired position and orientation of the robot 10 inputted by the operator, an image 134 that indicates by graphics the desired position and orientation inputted by the operator, motion start button 136, halt button 138, input error indication box 140 and upper limit input box 142 are displayed. The images 132 and 134 correspond to a "first image" and "second image" recited in claims, respectively.

In the image 132, a plurality of, i.e., three input boxes, precisely first to third input boxes 132a, 132b, 132c are shown. In the first input box 132a is shown the desired moving distance in the forward moving direction (i.e., in the plus direction of the X axis) of the robot 10 by a numeric value (e.g., in meters), which can be freely inputted by operating the keyboard 110. In the second input box 132b is shown the desired moving distance to the left as viewed in the forward moving direction (i.e., in the plus direction of the Y axis) of the robot 10 by a numeric value (e.g., in meters), which also can be freely inputted by operating the keyboard 110. The two values inputted in the first and second input boxes 132a, 132b indicate the desired position of the robot 10. Negative values in the first and second input boxes 132a, 132b mean the desired moving distance in the rearward moving direction and the desired moving distance to the right as viewed in the forward moving direction.

In the third input box 132c is shown the orientation at the time when the robot 10 reaches the desired position by a numeric value (angle), which can be freely inputted by operating the keyboard 110. A positive value in the input box 132c means that the front face of the robot 10 at the desired position turns counterclockwise (turns to left) from the current position, and a negative value means that it turns clockwise (turns to right). One of the input boxes is selected by touching the display 112 or manipulating the mouse 114.

FIGS. 6 to 10 are explanatory views each showing the desired position and orientation of the robot 10. In FIGS. 6 to 10, the robot 10 before moving is indicated by the solid line and that after moving (or changing the orientation) by the two-dotted line. The moving direction (or an angle of the orientation change) of the robot 10 is indicated by an arrow of the two-dashed line and the orientation thereof by an arrow in the solid line.

Figure 6:
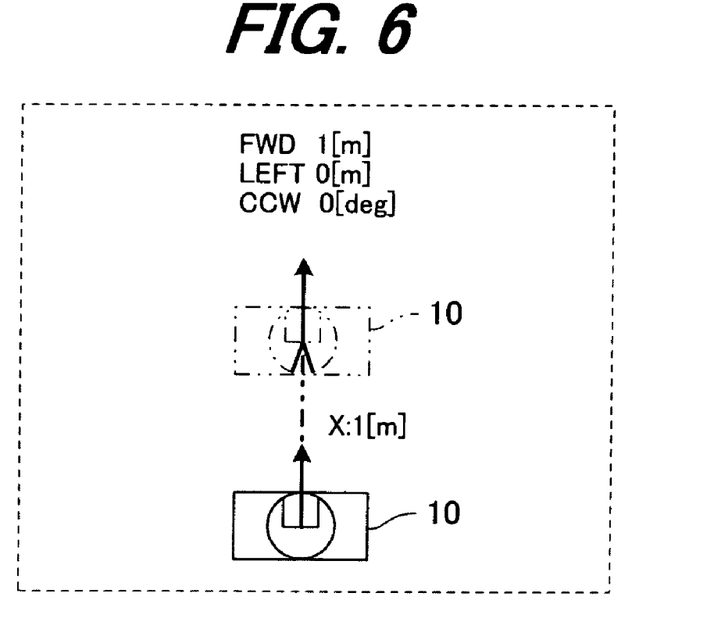
FIG. 6 is an explanatory view showing a desired position and orientation of the robot shown in FIG. 1.

As shown in FIG. 6, when "FWD 1 [m]" (first input box 132a), "LEFT 0 [m]" (second input box 132b) and "CCW 0 [deg]" (third input box 132c) are inputted, a position of one meter forward in the forward moving direction is defined as the desired position. The orientation of the robot 10 after moving is the same as that before moving.

Figure 7:
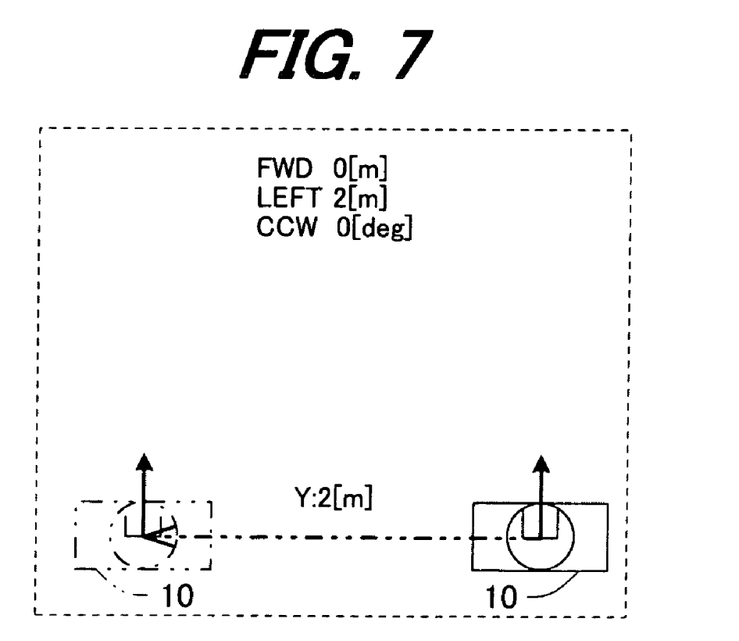
FIG. 7 is an explanatory view similar to FIG. 6 showing the desired position and orientation of the robot shown in FIG. 1.

As shown in FIG. 7, when "FWD 0 [m]", "LEFT 2 [m]" and "CCW 0 [deg]" are inputted, a position of two meters left as viewed in the forward moving direction is defined as the desired position. The orientation of the robot 10 after moving is the same as that before moving.

Figure 8:
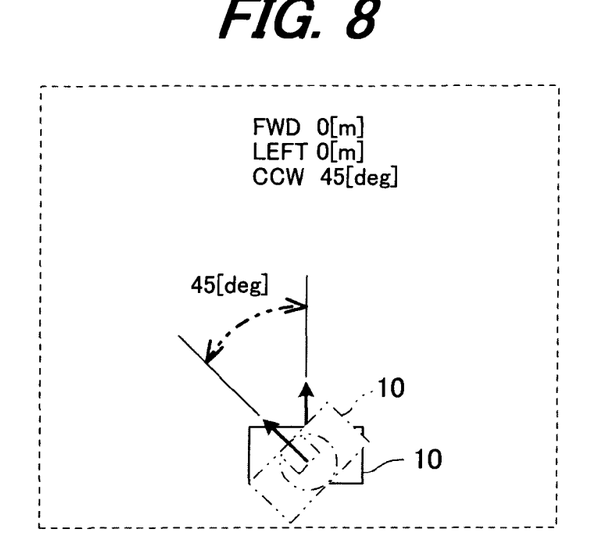
FIG. 8 is an explanatory view similar to FIG. 6 showing the desired position and orientation of the robot shown in FIG. 1.

As shown in FIG. 8, when "FWD 0 [m]", "LEFT 0 [m]" and "CCW 45 [deg]" are inputted, the current position is newly defined as the desired position and an orientation where the robot 10 is turned counterclockwise by 45 degrees about the Z axis from the current orientation is defined as the orientation at the desired position. Specifically, in this case, the robot 10 is changed its orientation to the left by 45 degrees at the same position.

Figure 9:
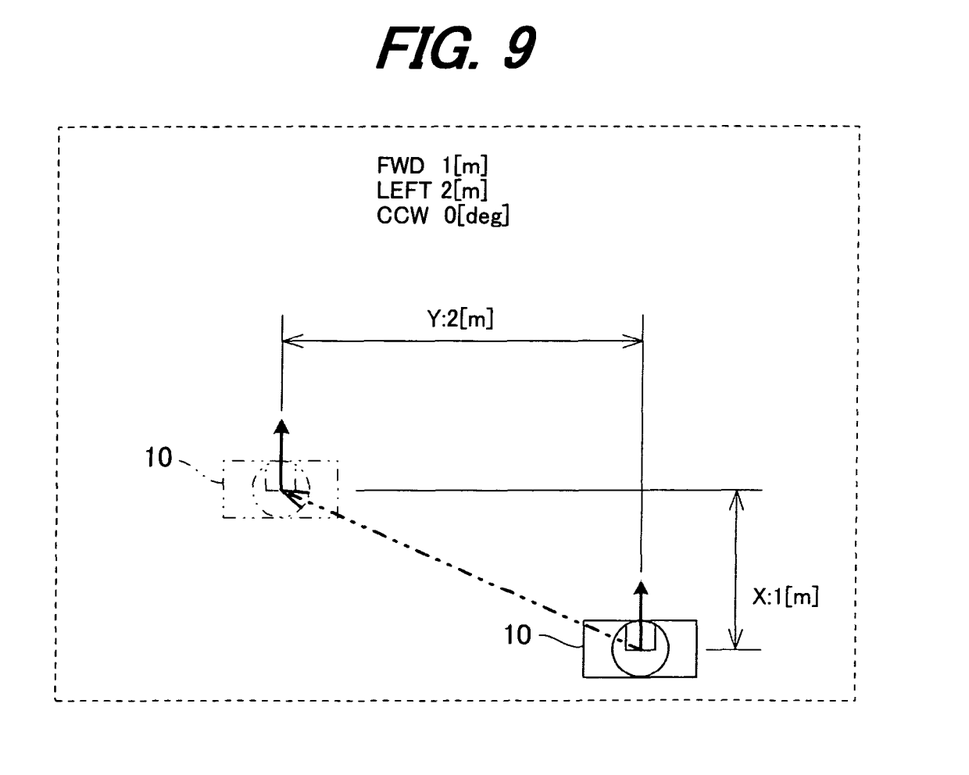
FIG. 9 is an explanatory view similar to FIG. 6 showing the desired position and orientation of the robot shown in FIG. 1.

As shown in FIG. 9, when "FWD 1 [m]", "LEFT 2 [m]" and "CCW 0 [deg]" are inputted, a position of one meter forward and two meters left is defined as the desired position. In other words, the robot 10 is moved diagonally forward left $(\tan^{-1}(2/1) \, [\deg])$ by $5^{1/2}$ meters. The orientation of the robot 10 after moving is the same as that before moving.

Figure 10:
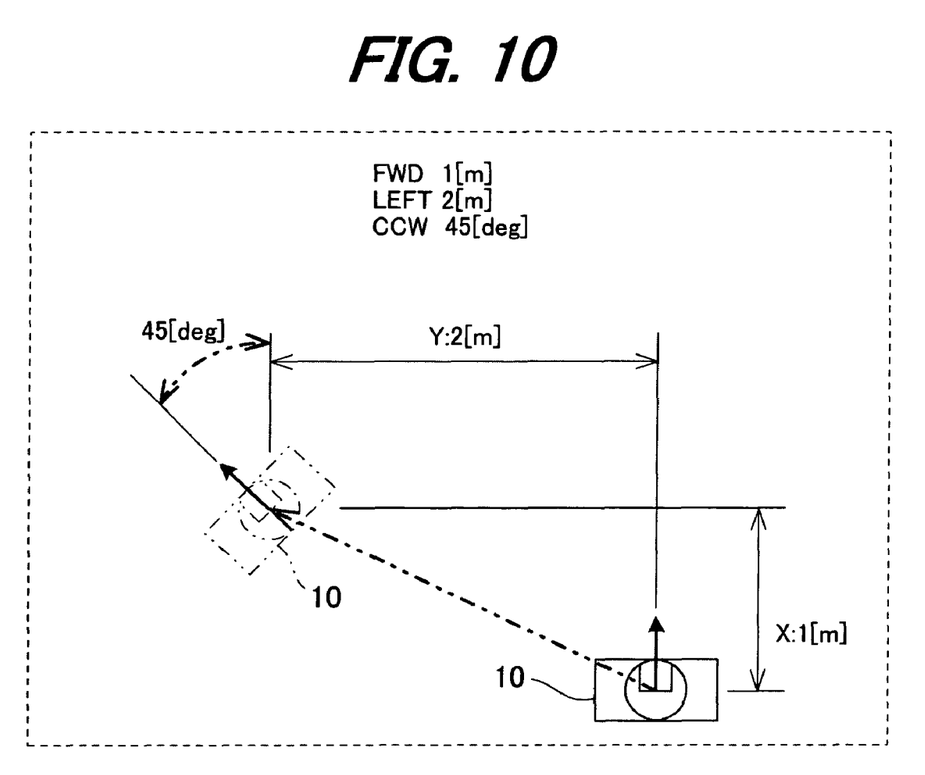
FIG. 10 is an explanatory view similar to FIG. 6 showing the desired position and orientation of the robot shown in FIG. 1.

As shown in FIG. 10, when "FWD 1 [m]", "LEFT 2 [m]" and "CCW 45 [deg]" are inputted, a position of one meter forward and two meters left is defined as the desired position and an orientation where the robot 10 is turned counterclockwise by 45 degrees from the current orientation is defined as the orientation at the desired position.

In the actual space, in the case of the example shown in FIG. 10, the robot 10 can be turned counterclockwise by 45 degrees from the current orientation as moving by taking the shortest way (minimum number of walking steps) to the desired position, i.e., position of one meter forward and two meters left, and also can be first moved 1 meter forward, then moved 2 meters left and changed its orientation at that position.

The explanation of FIG. 5 will be resumed. In the center of the image 134 is shown the robot 10, i.e., the appearance view 134a of the robot 10 viewed from the top. Two arrows (graphics (symbols)) 134b, 134c are also shown in the image 134. The direction of the arrow 134b having a straight shape indicates the moving direction of the robot 10 and the length thereof indicates the magnitude of moving distance. The direction of the arrow 134c having a curve shape indicates whether the robot 10 is turned to clockwise or counterclockwise and the length thereof indicates the magnitude of angle of the orientation change.

The directions and lengths of the arrows 134b, 134c are changed based on (in response to) the desired position and orientation inputted through the input boxes 132a, 132b, 132c by numeric values. For example, the lengths of the arrows 134b, 134c increase with increasing values in the input boxes 132a, 132b, 132c.

The directions and lengths of the arrows 134b, 134c can be freely changed in response to the touching operation of the display 112 or manipulation of the mouse 114. Specifically, the desired direction and orientation of the robot 10 can be inputted using the graphics (arrows 134b, 134c) by touching the display 112 or manipulating the mouse 114. Numeric values in the input boxes 132a, 132b, 132c are changed based on (in response to) the desired position and orientation inputted using the graphics.

The upper limit input box 142 is freely inputted with the upper limit of the moving distance of the robot 10 (i.e., the value of the maximum movable distance with one command) by a numeric value through the keyboard 110.

The explanation of FIG. 4 will be resumed. The external terminal 90 is further equipped with a motion command generator 146, upper limit setter 148, input discriminator 150, motion command transmitter 152 and motion information receiver 154.

The desired position and orientation inputted by the operator are sent to the motion command generator 146. Based on the inputted desired position and orientation, the motion command generator 146 generates motion commands for the motors mounted on the robot 10.

When one of the specific motion buttons is clicked, the desired position and orientation at the time when the specified motion (e.g., walking up and down stairs, turning, etc.) is performed are displayed in the images 132, 134, and the motion command to execute the specified motion is generated in the motion command generator 146.

When the operator clicks the motion start button 136, the motion command generated by the motion command generator 146 is forwarded to the input discriminator 150. Based on the inputted motion command, the input discriminator 150 calculates a moving distance from the current position to the desired position of the robot 10 and discriminates whether the calculation result exceeds the upper limit. The upper limit is set by the upper limit setter 148 in accordance with a value inputted in the upper limit input box 142 (the input value in the upper limit input box 142 is directly set as the upper limit).

When the moving distance to the desired position exceeds the upper limit, the desired position is invalidated and an indication (message) to notify that the desired position is invalid is turned on in the input error indication box 140.

On the other hand, when the desired position is valid (the moving distance to the desired position does not exceed the upper limit), the motion command is transmitted to the robot 10 through the motion command transmitter 152. The robot 10 is equipped with a motion command receiver 156 that can be freely communicated by radio with the motion command transmitter 152. The motion command transmitted from the motion command transmitter 152 is received by the motion command receiver 156 and inputted to the motion controller 106. If the operator operates the halt button 138, the desired position and orientation are initialized and the instruction of the motion of the robot 10 is cancelled.

Based on the inputted self-information and motion command, the motion controller 106 determines whether the robot 10 can safely move without contacting an obstacle. This determination is hereinafter called the "movability determination." When it is determined that the robot 10 can safely move, the motion controller 106 controls the motion of the robot 10 based on the motion command and outputs of the sensors. Specifically, based on the inputted values the motion controller 106 calculates control values for the motors mounted on the robot 10 and sends the calculated control values to the motors to control them, thereby controlling the robot 10 to move to the desired position in the actual space and to turn for regulating its orientation. Although a technique described in, for example, Japanese Laid-Open Patent Application No. Hei 10(1998)-277969 earlier proposed by the applicant is applied as a locomotion control of the robot 10, it is not directly related to the gist of this invention, so will not be explained here.

The motion controller 106 sends the result of the movability determination and the motion information of the robot 10 to the external terminal 90 through a motion information transmitter 158. The motion information of the robot 10 includes a motion result, the amount of motion on a real-time basis and the like. The amount of motion of the robot 10 can be obtained from the control values to be forwarded to the motors or from the outputs of the sensors such as a rotation angle sensor 92.

The motion information receiver 154 of the external terminal 90 is freely communicated by radio with the motion information transmitter 158 to receive the determination result and motion information sent from the motion information transmitter 158. The received determination result and motion information are inputted to the image generator 116.

The image generator 116 displays the determination result and motion information (e.g., an indication notifying the completion of a motion or the rejection (motion rejection) and reason thereof) sent from the motion controller 106 in the motion information indication box 128. Further, based on the inputted amount of motion, the image generator 116 generates a motion image or motion picture image of the robot 10 and displays it in the image 134. Specifically, it continuously changes the appearance view 134a of the robot 10 displayed in the image 134 in response to the motion of the robot 10 to express the movement or orientation change of the robot 10. It also changes the directions and lengths of the arrows 134b, 134c in response to the movement or orientation change.

The communication state indication image 124 in the main panel 120 indicates whether the external terminal 90 and robot 10 are properly communicated with each other. When the emergency stop button 126 is clicked during the motion of the robot 10, the motion command for stopping the robot 10 is generated in the motion command generator 146 and sent to the motion controller 106 to stop the motion of the robot 10.

Figure 11:
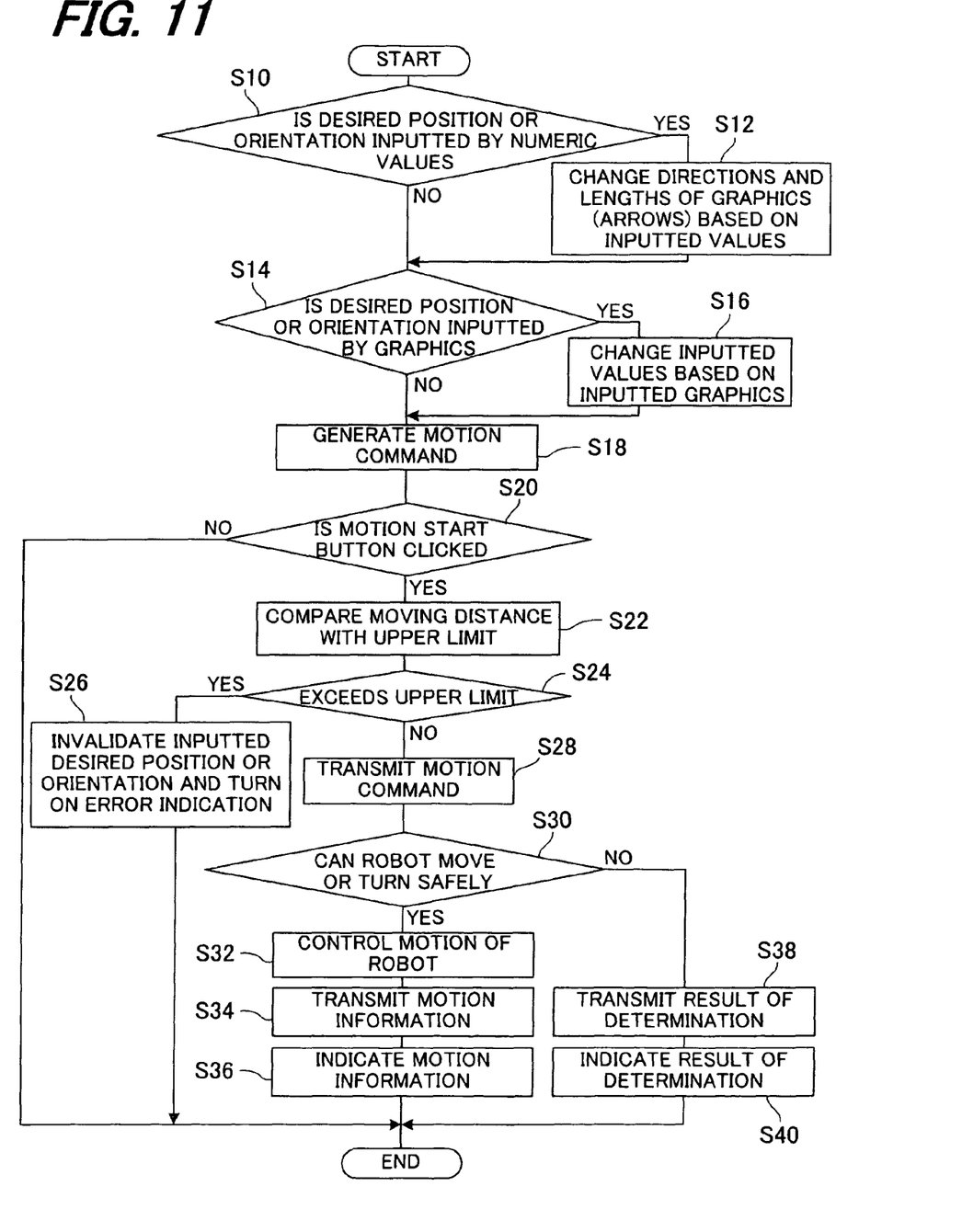
FIG. 11 is a flowchart showing a sequence of processing from an indication control of the display to a motion control of the robot, executed by the robot and external terminal shown in FIG. 4.

Next, the processing from an indication control of the display 112 to the motion control of the robot 10 will be again explained in time series order in reference to FIG. 11.

FIG. 11 is a flowchart showing a series of processing from the indication control of the display 112 to the motion control of the robot 10, executed by the robot 10 and external terminal 90. In the following explanation, notifications in parentheses after step numbers denote the blocks in FIG. 4 corresponding to the executed processing.

The explanation of the flowchart in FIG. 11 will be made. First, in S10 (image generator 116), it is determined whether at least one of the desired position and orientation of the robot 10 is inputted by numeric values through the keyboard 110. When the result in S10 is Yes, the program proceeds to S12 (image generator 116), in which based on (in response to) the inputted values, the directions and lengths of the graphics (arrows 134b, 134c) are changed. When the result in S10 is No, the processing of S12 is skipped.

The program proceeds to S14 (image generator 116), in which it is determined whether at least one of the desired position and orientation of the robot 10 is inputted using the graphics by touching the display 112 or manipulating the mouse 114. When the result in S14 is Yes, the program proceeds to S16 (image generator 116), in which based on (in response to) the inputted graphics, the numeric values in the input boxes 132 are changed. When the result in S14 is No, the processing in S16 is skipped.

Then, in S18 (motion command generator 146), based on the inputted desired position and orientation, the motion command is generated, and in S20 (motion command generator 146), it is determined whether the motion start button 136 is clicked. When the result in S20 is No, the remaining steps are skipped. When the result in S20 is Yes, the program proceeds to S22 (upper limit setter 148, input discriminator 150), in which the moving distance to the desired position is calculated to compare the calculation result with the upper limit, and to S24 (input discriminator 150), in which it is determined whether the calculated moving distance exceeds the upper limit. When the result in S24 is Yes, the program proceeds to S26 (image generator 116, input discriminator 150), in which the inputted desired position and orientation are invalidated and the input error indication (indication to notify the invalidation of the desired position) is turned on in the input error indication box 140.

When the result in S24 is No, the program proceeds to S28 (motion command transmitter 152), in which the motion command is transmitted, and to S30 (motion controller 106), in which based on the self-information and motion command, the movability determination of the robot 10 is made (i.e., it is determined whether the robot 10 can safely move without contacting an obstacle). When the result in S30 is Yes (i.e., it is determined to be movable), the program proceeds to S32 (motion controller 106), in which the motion of the robot 10 is controlled (the robot 10 is controlled to be moved or turned), and to S34 (motion information transmitter 158), the motion information including the motion result, the amount of motion etc. is transmitted to the external terminal 90. Next, in S36 (motion information receiver 154, image generator 116), the received motion information (completion of the motion, etc.) is indicated in the motion information indication box 128 and based on the amount of motion of the robot 10, a motion image of the robot 10 is generated on a real-time basis to be displayed in the image 134.

When the result in S30 is No (i.e., it is determined not to be movable), the program proceeds to S38 (motion information transmitter 158), in which the result of the movability determination is sent to the external terminal 90, and then to S40 (motion information receiver 154, image generator 116), in which the received determination result is indicated in the motion information indication box 128. Since the result in S30 is negative, the processing in S40 is to light an indication notifying a rejection (motion rejection) and reason thereof.

Thus, in the mobile robot control system according to the first embodiment of this invention, since it is configured to display the image 132 indicative of the desired position and orientation of the robot 10 by numeric values and the image 134 indicative of the same by the graphics (arrows 134b, 134c) on the display 112, the operator can check the desired position and orientation of the robot with both of the numeric values and graphics. As a result, it becomes possible to prevent the operator from manipulating (inputting) erroneously and operate the robot to be moved or turned as desired by the operator.

Further, since it is configured such that the graphics displayed in the image 134 are changed based on the desired position and orientation inputted by numeric values, while the numeric values in the image 132 are changed based on the desired position and orientation inputted using the graphics, the operator can utilize the graphics to check the desired position and orientation inputted by numeric values. As a result, it becomes possible to efficiently prevent the operator from manipulating (inputting) erroneously and operate the robot to be moved or turned as desired by the operator.

Further, it is configured to determine whether the robot 10 is movable based on the self-information including the surrounding information and the desired position and orientation, and a determination result of the movability is indicated in the motion information indication box 128. With this, even when the operator cannot visually check the robot or the surrounding of a destination of the robot, it becomes possible to operate the robot to be moved or turned as desired by the operator.

Further, since it is configured to indicate the robot 10 (specifically, the appearance view 134a thereof) with the graphics in the image 134, the operator can recognize the desired position and orientation more easily, thereby further efficiently preventing the operator from manipulating erroneously.

Further, since it is configured to generate a motion image representing the robot 10 based on the amount of motion of the robot 10 and display the generated motion image with the graphics in the image 134, the operator can recognize the desired position and orientation more easily, thereby still further efficiently preventing the operator from manipulating erroneously.

Further, it is configured to set the upper limit of the moving distance of the robot 10 and, when the moving distance exceeds the upper limit, invalidate the inputted desired position. Owing to the upper limit that is appropriately set depending on the degree of operator's proficiency, it becomes possible to prevent the operator's intention from deviating from the actual motion of the robot. As a result, it becomes possible to operate the robot to be moved or turned as desired by the operator.

Second Embodiment

Next, a mobile robot control system according to the second embodiment will be explained.

Figure 12:
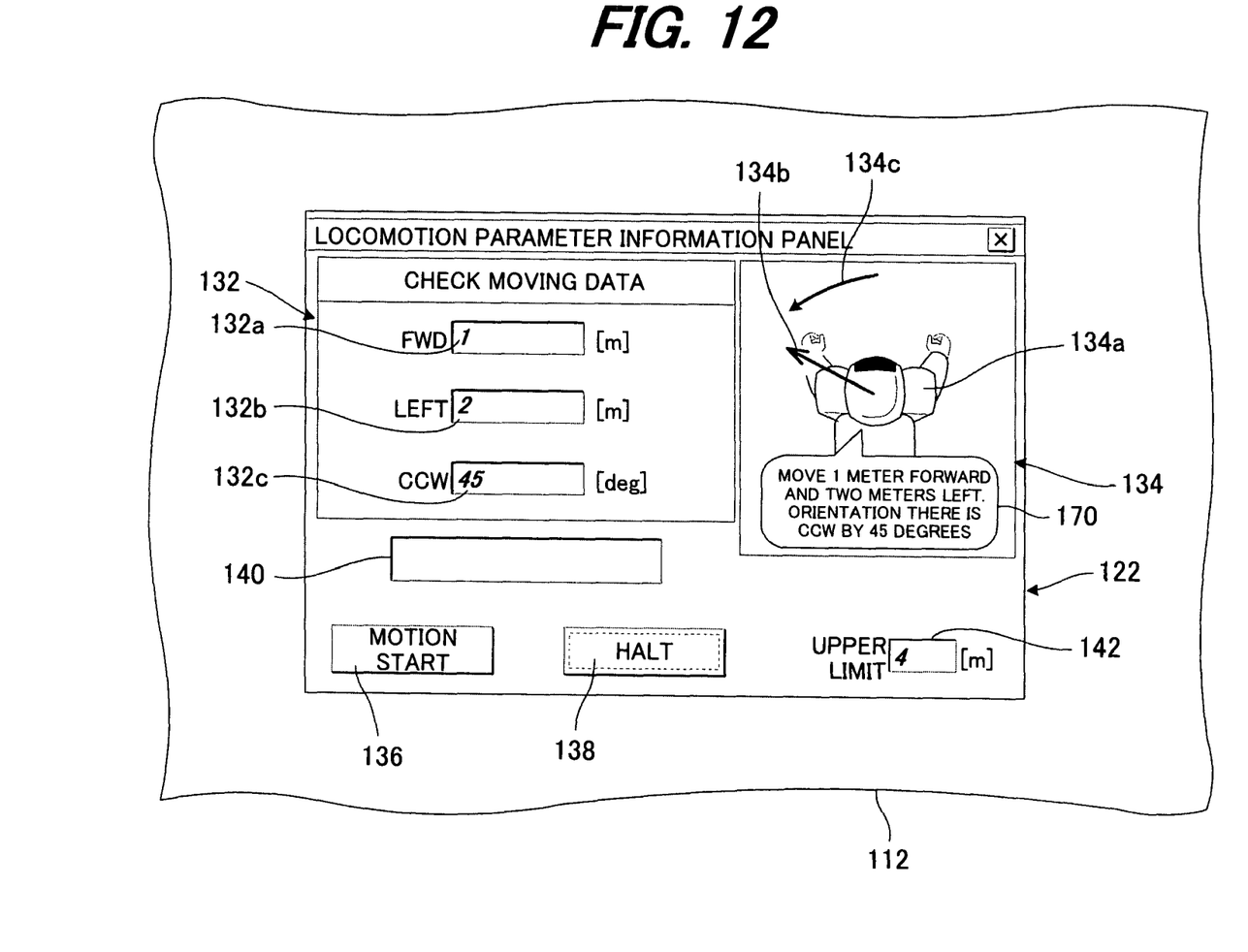
FIG. 12 is an enlarged plan view showing a part of a display and displayed images thereon, in a mobile robot control system according to a second embodiment of the invention.

FIG. 12 is an enlarged plan view showing a part of a display and displayed image thereon, in a mobile robot control system according to a second embodiment of the invention.

The explanation will be made with focus on points of difference from the first embodiment. In the second embodiment, the number of image corresponding to a term "first image" in claims is plural, specifically two.

As shown in FIG. 12, there are indicated in the locomotion parameter information panel 122 an image 170 in addition to the above-mentioned images 132, 134. The image 170 indicates the desired position and orientation of the robot 10 by language (characters) including at least a numeric value.

The image 170 is displayed in the image 134. The image 170 comprises an outer frame representing a word balloon pulled from the appearance view 134a of the robot and text in the outer frame. The text is constituted of the numeric values in the image 132 and language combined therewith to express the desired position and orientation of the robot 10. For instance, when 1 [m], 2 [m] and 45 [deg] are inputted in the first to third input boxes 132a, 132b, 132c, text as "it moves one meter forward and two meters left, and the orientation there is counterclockwise by 45 degrees" is displayed in the image 170. Similar to the numeric values in the image 132, the numeric values in the image 170 are changed based on (in response to) the desired position and orientation inputted using the graphics.

The remaining configuration is the same as that in the first embodiment, so the explanation will not be made.

Thus since it is configured to indicate the desired position and orientation of the robot 10 according to the second embodiment in the (multiple) images 132, 170 by numeric values or language including the numeric values and in the image 134 by the graphics on the display 112, the operator can check the desired position and orientation of the robot more accurately. In particular, use of language (text) in the image 170 to express the desired position and orientation makes possible to move the robot as desired by the operator more reliably.

As stated above, the first and second embodiments of this invention is configured to have a system for controlling motion of a mobile robot (10) such that the robot moves to a desired position, characterized by: inputting means (keyboard 110, display 112, mouse 114) provided to be manipulated by an operator for inputting at least one of the desired position and orientation of the robot at a time when the robot reaches the desired position; displaying means (image generator 116) for displaying an image (display 112) indicative of the inputted desired position and orientation on a display; and control means (motion controller 116) for controlling the motion of the robot based on the inputted desired position and orientation; and the displaying means displays a first image (image 132, image 170) indicative of the inputted desired position and orientation by numeric values or language including at least the numeric values and a second image (image 134) indicative of the inputted desired position and orientation by graphics (arrows 134b, 134c).

They are configured such that the inputting means includes: numeric value inputting means (keyboard 110) provided to be manipulated by an operator for inputting at least one of the desired position and orientation by the numeric values; and the displaying means changes the graphics displayed on the second image based on the desired position and orientation inputted by the numeric values (S12 of the FIG. 11 flowchart).

They are configured such that the inputting means includes: graphic inputting means (display 112, mouse 114) provided to be manipulated by an operator for inputting at least one of the desired position and orientation by the graphics; and the displaying means changes the numeric values displayed on the first image based on the desired position and orientation inputted by the graphics (S16 of the FIG. 11 flowchart).

They are configured such that the system further includes: surrounding information acquiring means (CCD cameras 84R, 84L, surrounding information generator 100) for acquiring surrounding information of the robot; and movability determining means (motion controller 116, S30 of the FIG. 11 flowchart) for determining whether the robot can move based on the inputted desired position and orientation and the acquired surrounding information; and the displaying means displays a third image (motion information indication box 128) indicative of a result of the movability determination on the display.

They are configured such that the displaying means displays the robot (more specifically its appearance view 134a) with the graphics on the second image.

They are configured such that the displaying means generates a motion image of the robot based on amount of motion of the robot, and displays the motion image with the graphics on the second image (S36 of the FIG. 11 flowchart).

They are configured such that the system further includes: upper limit setting means (upper limit setter 148) for setting an upper limit of a distance from the current position of the robot to the desired position; and desired position invalidating means (input discriminator, S26 of the FIG. 11 flowchart) for invalidating the inputted desired position when the distance exceeds the upper limit.

It should be noted in the foregoing that, although a biped humanoid robot is disclosed as an example of the mobile robot, this invention can be applied to the robot having one leg, three or more legs, and also to a wheel or crawler type mobile robot.

It should also be noted that, although the graphics to show the desired position and orientation of the robot is configured to be the arrows, another graphic (symbol) can be applied. Further, although the appearance view 134a of the robot is indicated in the image 134, it can be a schematic view or mark instead. Although both of the display 112 (touch panel) and mouse 114 can be utilized to input the graphics representing the desired position and orientation of the robot, it can be configured to use either one of them solely.

It should also be noted that, although the number of the image corresponding to the "first image" described in claims is one in the first embodiment (image 132) and two in the second embodiment (images 132, 170), it can be three or more. The image 170 is configured to be a word balloon type, but its shape is not limited thereto and the text therein also can be any expression other than the foregoing example. Further, although only one image is indicated as the image corresponding to the "second image" in the first and second embodiments (image 134), the number thereof can be plural. The allocation and size of the images 132, 134, 170 are not limited to the illustrated example.

INDUSTRIAL APPLICABILITY

According to this invention, in the mobile robot control system, it is configured such that the operator inputs at least one of a desired position of a mobile robot and its orientation when the robot reaches the desired position, the motion of the robot is controlled based on the inputted desired position and orientation, and a first image that shows the desired position and orientation by a numeric value or language including at least the numeric value and a second image that shows the desired position and orientation by graphics are indicated on the display. With this, the operator can check the desired position and orientation of the robot with both of the numeric value (or language including the numeric value) and graphics. As a result, it becomes possible to prevent the operator from manipulating (inputting) erroneously and operate the robot to be moved or turned as desired by the operator.

The invention claimed is:

1. A system for controlling motion of a mobile robot such that the robot moves to a desired position, comprising:
   a. means provided to be manipulated by an operator for inputting at least one of the desired position and orientation of the robot at a time when the robot reaches the desired position;
   b. means for displaying an image indicative of the inputted desired position and orientation on a display;
   c. means for controlling the motion of the robot based on the inputted desired position and orientation;
   d. means for setting an upper limit of a distance from a current position of the robot to the desired position; and
   e. means for invalidating the inputted desired position when the distance exceeds the upper limit;
   and the means for displaying displays a first image indicative of the inputted desired position and orientation by numeric values or language including at least the numeric values and a second image indicative of the inputted desired position and orientation by graphics composed of arrows whose directions and lengths are changeable.

2. The system according to claim 1, wherein the means for inputting includes:
   f. means provided to be manipulated by the operator for inputting at least one of the desired position and orientation by the numeric values;
   and the means for displaying changes the graphics displayed on the second image based on the desired position and orientation inputted by the numeric values.

3. The system according to claim 1, wherein the means for inputting includes:
   g. means provided to be manipulated by the operator for inputting at least one of the desired position and orientation by the graphics;

and the means for displaying changes the numeric values displayed on the first image based on the desired position and orientation inputted by the graphics.

4. The system according to claim 1, further including:
   h. means for acquiring surrounding information of the robot; and
   i. means for determining whether the robot can move based on the inputted desired position and orientation and the acquired surrounding information;
   and the means for displaying displays a third image indicative of a result of the movability determination on the display.

5. The system according to claim 1, wherein the means for displaying displays the robot with the graphics on the second image.

6. The system according to claim 1, wherein the means for displaying generates a motion image of the robot based on amount of motion of the robot, and displays the motion image with the graphics on the second image.

7. A method of controlling motion of a mobile robot such that the robot moves to a desired position, comprising the steps of:
   a. inputting at least one of the desired position and orientation of the robot at a time when the robot reaches the desired position;
   b. displaying an image indicative of the inputted desired position and orientation on a display;
   c. controlling the motion of the robot based on the inputted desired position and orientation;
   d. setting an upper limit of a distance from a current position of the robot to the desired position; and
   e. invalidating the inputted desired position when the distance exceeds the upper limit;
   and the step of displaying displays a first image indicative of the inputted desired position and orientation by numeric values or language including at least the numeric values and a second image indicative of the inputted desired position and orientation by graphics composed of arrows whose directions and lengths are changeable.

8. The method according to claim 7, wherein the step of inputting includes the step of:
   f. inputting at least one of the desired position and orientation by the numeric values;
   and the step of displaying changes the graphics displayed on the second image based on the desired position and orientation inputted by the numeric values.

9. The method according to claim 7, wherein the step of inputting includes the step of:
   g. inputting at least one of the desired position and orientation by the graphics;
   and the step of displaying changes the numeric values displayed on the first image based on the desired position and orientation inputted by the graphics.

10. The method according to claim 7, further including the steps of:
    h. acquiring surrounding information of the robot; and
    i. determining whether the robot can move based on the inputted desired position and orientation and the acquired surrounding information;
    and the step of displaying displays a third image indicative of a result of the movability determination on the display.

11. The method according to claim 7, wherein the step of displaying displays the robot with the graphics on the second image.

12. The method according to claim 7, wherein the step of displaying generates a motion image of the robot based on amount of motion of the robot, and displays the motion image with the graphics on the second image.

* * * * *